US008802234B2

(12) United States Patent
Che et al.

(10) Patent No.: US 8,802,234 B2
(45) Date of Patent: Aug. 12, 2014

(54) COMPOSITE NANOPARTICLES AND METHODS FOR MAKING THE SAME

(75) Inventors: Yong Che, Ann Arbor, MI (US); Makoto Murakami, Ann Arbor, MI (US); Wei Guo, Canton, MI (US)

(73) Assignee: Imra America, Inc., Ann Arbor, MI (US)

( * ) Notice: Subject to any disclaimer, the term of this patent is extended or adjusted under 35 U.S.C. 154(b) by 536 days.

(21) Appl. No.: 12/983,534

(22) Filed: Jan. 3, 2011

(65) Prior Publication Data

US 2012/0168669 A1 Jul. 5, 2012

(51) Int. Cl.
B32B 5/16 (2006.01)

(52) U.S. Cl.
USPC ........ 428/402; 428/403; 428/842.3; 472/212; 977/838

(58) Field of Classification Search
USPC ......... 428/402, 403, 842.3; 427/212; 977/838
See application file for complete search history.

(56) References Cited

U.S. PATENT DOCUMENTS

| 7,608,308 | B2 | 10/2009 | Liu | |
|---|---|---|---|---|
| 2,196,192 | A1 | 8/2010 | Liu | |
| 2002/0098529 | A1* | 7/2002 | Tan et al. ..................... | 435/7.21 |
| 2004/0155184 | A1 | 8/2004 | Stockman et al. | |
| 2006/0153728 | A1 | 7/2006 | Schoenung et al. | |
| 2007/0059705 | A1* | 3/2007 | Lu et al. ........................... | 435/6 |
| 2008/0187684 | A1 | 8/2008 | Hu | |
| 2009/0042051 | A1* | 2/2009 | Skarman et al. .............. | 428/548 |
| 2009/0236569 | A1* | 9/2009 | Pike-Biegunski et al. . | 252/519.3 |
| 2009/0246413 | A1 | 10/2009 | Murakami | |
| 2009/0246530 | A1 | 10/2009 | Murakami | |
| 2010/0164489 | A1* | 7/2010 | Lukaszew et al. ......... | 324/244.1 |
| 2010/0196192 | A1* | 8/2010 | Liu et al. ....................... | 420/463 |
| 2010/0197116 | A1 | 8/2010 | Shah et al. | |
| 2010/0227133 | A1 | 9/2010 | Liu | |
| 2011/0196044 | A1 | 8/2011 | Hu et al. | |

FOREIGN PATENT DOCUMENTS

WO 2010123993 A1 10/2010

OTHER PUBLICATIONS

Kil et al, "Nanosize Particles of ZrVFe Alloy by Pulsed Laser Ablation in Ethanol", Materials Transaction (online), Nov. 2005, retrieved on May 25, 2012, vol. 46, No. 11, pp. 2509-2513.
Garcia et al, "Ferromagnetism in Twinned Pt Nanoparticles Obtained by Laser", Chemistry of Materials (online), Jan. 26, 2007, retrieved on May 25, 2012, vol. 19, No. 4, pp. 889-893.
Y. Bao et al. A general approach to synthesis of nanoparticles with controlled morphologies and magnetic properties Journal of Applied Physics 97, 10J317 (2005).
P. Boyer et al. Nanoclustered Co—Au particles Fabricated by Femtosecond Laser Fragmentation in Liquids, J. Phys. Chem. C (2010) 114, 13497-13500.
H. Yu et al Dumbbell-like Bifunctional Au—Fe3O4 Nanoparticles Nano Letters (2005) vol. 5, No. 2, 379-382.

* cited by examiner

*Primary Examiner* — Leszek Kiliman
(74) *Attorney, Agent, or Firm* — Sughrue Mion, PLLC; Richard C. Turner (57) ABSTRACT

A composite nanoparticle, for example a nanoparticle containing one or a plurality of cores embedded in another material. A composite nanoparticle can be formed by a one step process that includes: ejecting material from a bulk target material using physical energy source, with the bulk target material disposed in a liquid. Composite nanoparticles are formed by cooling at least a portion of the ejected material in the liquid. The composite fine particles may then be collected from the liquid. A product that includes composite fine particles may be formed with laser ablation, and ultrashort laser ablation may be utilized so as to preserve composite nanoparticle stoichiometry. For applications of the composite fine particles, optical properties and/or magnetic properties may be exploited for various applications.

17 Claims, 12 Drawing Sheets

FIG. 1

Au-Fe in water — TABLE 1

| d-space | Au | Fe | Fe$_3$O$_4$ |
|---|---|---|---|
| 2.98 | | | 2.86 |
| 2.56 | | | 2.44 |
| 2.37 | 2.35 | | 2.34 |
| 2.16 | | | |
| 2.1 | 2.04 | 2.03 | 2.02 |
| 1.64 | | | 1.65 |
| 1.51 | | | 1.56 |
| 1.41 | 1.44 | 1.43 | 1.43 |
| 1.23 | 1.23 | 1.17 | |

Au-Fe in acetone — TABLE 2

| d-space | Au | Fe | FeO |
|---|---|---|---|
| 2.49 | | | 2.47 |
| 2.3 | 2.35 | | |
| 2.08 | | | 2.14 |
| 1.97 | 2.04 | 2.03 | |
| 1.6 | | | 1.51 |
| 1.39 | 1.44 | 1.43 | |
| 1.18 | 1.23 | 1.17 | |

TABLE 3

| | NAME | NUMBER | DESCRIPTION |
|---|---|---|---|
| A | MULTIPLE CORES (SEPARATED) | 911 | MULTIPLE CORES |
| | | 913 | SHELL |
| B | SINGLE CORE | 921 | SINGLE CORE |
| | | 923 | SHELL |
| C | MULTIPLE CORES (ATTACHED) | 931 | MULTIPLE CORES |
| | | 933 | SHELL |
| D | COMPOSITIONALLY ANISOTROPIC STRUCTURE | 941 | MATERIAL 1 |
| | | 943 | MATERIAL 2 |
| E | TWO PARTICLES SHARE AN EDGE | 951 | MATERIAL 1 |
| | | 953 | MATERIAL 2 |

FIG. 10

COMPOSITE NANOPARTICLES AND METHODS FOR MAKING THE SAME

TECHNICAL FIELD

This invention relates to composite nanoparticles and methods to prepare the same.

BACKGROUND

In recent years, the intense research activities devoted to nanomaterials and their applications have led to development efforts aimed at achieving a wide variety of composite nanomaterials. It has been found that by finely mixing two or more materials or phases having different characteristics on a nanoscale, different properties, i.e. multifunctions, which are not attainable by either bulk composite material nor single phase nanomaterials, can be attained. Such composite materials, particularly nanoscale composites having portions with distinct material properties, are attractive for many applications. These multifunctional nanomaterials are particularly attractive for biological and biomedical applications, such as sensing, imaging, diagnosis, and therapeutics.

SUMMARY OF THE INVENTION

At least one embodiment provides for direct fabrication of composite fine particles, for example composite nanoparticles, in a liquid. At least a portion of the composite nanoparticles may then be collected from the liquid. Fabrication of a composite fine particle may be carried out without a requirement for preparation or dispersion of precursor nanoparticles in liquids and/or additional physical or chemical reactions, thereby providing for nanocomposite particle formation with a single processing/fabrication step.

At least one embodiment provides a step of removing materials from a composite material target using an energy source such as a laser, preferably a pulsed laser.

At least one embodiment provides a step of generation of composite particles at high temperature followed by quenching of the materials in a liquid, or in a plasma stream.

At least one embodiment provides a method to generate composite nanoparticles in one step using ultrashort pulsed laser ablation.

At least one embodiment provides a method to generate composite nanoparticles in one step, followed by collection of the composite nanoparticles in a liquid medium.

In at least in one embodiment, composite nanoparticles may comprise a magnetic material and thus have ferromagnetic properties, such as Fe—Au and iron-platinum (Fe—Pt) composite particles. Composite nanoparticles having ferromagnetic properties may be collected by applying a magnetic field.

By way of an example, UV-Visible spectra show that iron-gold (Fe—Au) composite nanoparticles collected in water exhibit a plasmon resonant peak from Au. The nanoparticles may be formed by ultrashort laser ablation, or by using another suitable energy source. The nanoparticles are then distributed in a liquid medium, for example mixed with thiolated polyethylene glycol (PEG-SH). The resultant product exhibits a plasmon resonant peak from Au. Thus, such composite nanoparticles can be used in exemplary applications such as: immunochromatography, surface enhanced Raman spectroscopy (SERS) activation, and coloring/labeling materials and other optical characterizations.

BRIEF DESCRIPTION OF THE DRAWINGS

FIG. 3 (FIGS. 3A and 3B) illustrates four images obtained by Z-contrast transmission electron microscopy (TEM). Fe—Au and Fe—Pt colloids were formed by laser ablation of corresponding composite targets in water and acetone.

FIG. 4 (FIGS. 4A and 4B) illustrates Z-contrast TEM images of Fe—Au colloids in acetone and in water and plots of corresponding line scan results.

DETAILED DESCRIPTION

Composite materials, particularly nanoscale composites having a portion of material with a distinct property, are attractive for many applications. Such composite materials may be referred to as composite fine particles, nanocomposites, or composite nanoparticles. For example, a composite fine particle may comprise a core-shell structure with a size (e.g.: width) less than about 1 µm in at least one dimension, a maximum width less than about 5 µm, and a core dimension in the range from about 1 nm to several hundred nm. The composite fine particles may provide multiple functions.

By decreasing the size of the composite materials to the nanometer (nm) level, additional unique features may be observed. For example, magnetic $Fe_3O_4$ nanoparticles combined with Au nanoparticles result in $Fe_3O_4$—Au nanocomposite particles. Such nanocomposites may be used for coloring and/or plasmon coupling applications. Superparamagnetic properties may be present when the particle size is close to a single magnetic domain, which may be less than 50 nm. When the particle size gets smaller, the ratio of surface area to volume increases, and thus catalytic activity typically increases. A plasmon peak position of Au nanoparticles may shift toward shorter wavelengths when the particle size gets smaller. Applications of nanocomposites are particularly attractive in drug delivery systems (DDS) and the general biomedical field.

Many material properties are dependent on the size of the material. For example, magnetic coercivity in magnetic particles and plasmon resonance in metal particles may be a function of the particle size. If a composite nanoparticle has multiple cores, its properties may be further tuned. Therefore, composite nanoparticles having multiple cores are also of interest.

Composite nanoparticles have been made by several methods, some of which will be discussed in the following paragraphs.

As a first example, a core-shell structure of metal composite particles can be obtained by growth of a material on a metal core. Preparation of a cobalt (Co) core and Au shell structure composite nanoparticle is disclosed in "A general approach to synthesis of nanoparticles with controlled morphologies and magnetic properties" (Y. Bao et al. Journal of Applied Physics 97, 10J317 (2005)). First, cobalt nanoparticles were synthesized by rapid decomposition of organometallic precursors in a coordinated solvent containing different surfactants in an argon atmosphere. By using pre-made cobalt nanoparticles as nuclei and Au compounds as a monomer, Au coated Co nanoparticles were grown.

As a second example, dumbbell-like nanoparticle composites were prepared using epitaxial growth of a material from a precursor solution using another material as particle seed. Details were disclosed in "Dumbbell-like Bifunctional Au—$Fe_3O_4$ Nanoparticles" (Nano Letters (2005) Vol. 5, No. 2, 379-382 H. Yu et al.). The dumbbell structure of Au—$Fe_3O_4$ was formed through epitaxial growth of iron oxide on the Au seeds, and the growth can be affected by the polarity of the solvent, as the use of some polar solvents leads to flower-like Au—$Fe_3O_4$ composite particles. The iron oxide was grown by decomposition of iron pentacarbonyl (Fe(CO)$_5$) over the surface of the Au nanoparticles, followed by oxidation in air.

As a third example, alloy and core-shell composite nanoparticles were obtained using laser ablation of different nanoparticles, or ablation of material in a precursor-containing system. In "Nanoclustered Co—Au particles Fabricated by Femtosecond Laser Fragmentation in Liquids", (J. Phys. Chem. C (2010) 114, 13497-13500), P. Boyer et al. disclosed a laser-based method of preparing composite nanoparticles of cobalt and gold, giving cobalt and gold colloids.

The above methods require advance preparation or dispersion of nanoparticles in a liquid, in which the materials of the nanoparticles are components of the desired composite material. Combining these particles requires a physical or chemical reaction. Thus, multiple process steps are required.

In various embodiments of the present invention, pulsed laser ablation may be used to make composite nanoparticles with unique properties, and provides advantages over the aforementioned techniques as will be shown below. For example, in various embodiments, composite nanoparticles are directly fabricated in a liquid medium with a one-step process, with no precursor, after which the nanoparticles are collected. In at least one embodiment, the process is carried out with ablation of a composite target in a liquid medium (to be dispersed).

In some embodiments one or more material properties may be tuned as functions of the laser parameters.

The following U.S. patent applications relate to laser-based methods and systems for generation of nanoparticles in liquids: U.S. application Ser. No. 12/320,617, entitled "Production of Metal and Metal-alloy Nanoparticles with High Repetition Rate Ultrafast Pulsed Laser Ablation in Liquids," filed Jan. 30, 2009; U.S. application Ser. No. 12/951,423, entitled "Nanoparticle Production in Liquid with Multiple-Pulse Ultrafast Laser Ablation," filed Nov. 22, 2010; and U.S. application Ser. No. 12/951,496 entitled "Production of Organic Compound Nanoparticles with High Repetition Rate Ultrafast Pulsed Laser Ablation in Liquids", filed Nov. 22, 2010. The contents of these applications are hereby incorporated by reference in their entirety.

Figure 1:
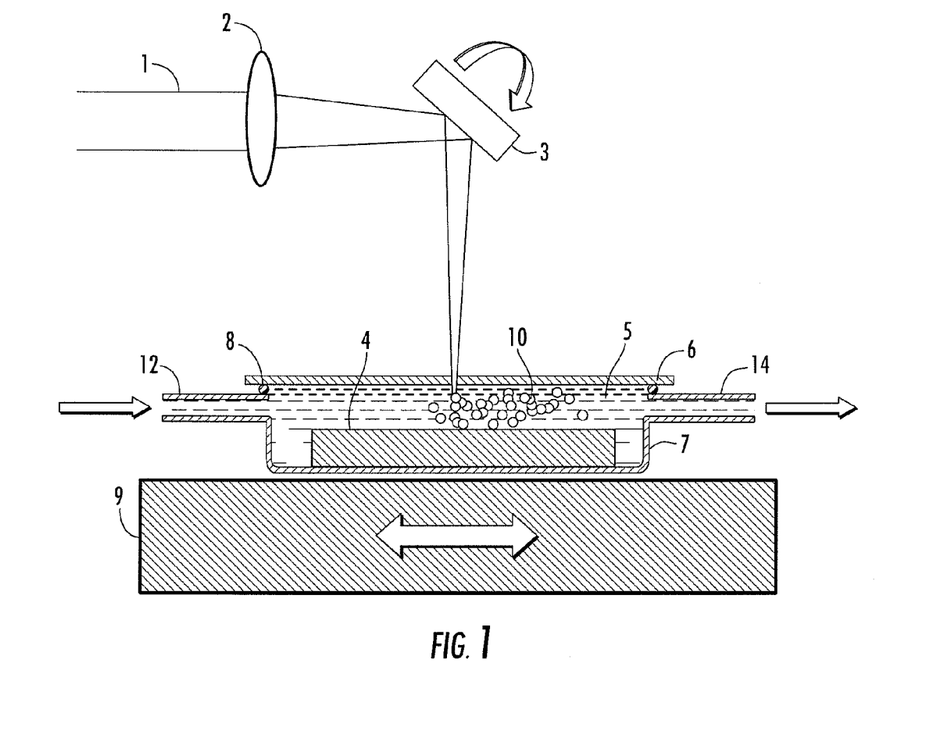
FIG. 1 schematically illustrates a laser-based system for producing composite nanoparticles in a liquid in accordance with the present invention.

FIG. 1 schematically illustrates a laser-based system for producing nanoparticles of complex compounds in a liquid using pulsed laser ablation in accordance with the present invention. In one embodiment a laser beam 1 is generated from an ultrafast pulsed laser source, not shown, and focused by a lens 2. The source of the laser beam 1 can be a pulsed laser or any other laser source providing suitable pulse duration, repetition rate, and/or power level as discussed below. The focused laser beam 1 then passes from the lens 2 to a guide mechanism 3 for directing the laser beam 1. The lens 2 can be placed between guide mechanism 3 and target 4. The guide mechanism 3 can be any of those known in the art including piezo-mirrors, acousto-optic deflectors, rotating polygons, a vibration mirror, and prisms. Preferably the guide mechanism 3 is a vibration mirror 3 to enable controlled and rapid movement of the laser beam 1. The guide mechanism 3 directs the laser beam 1 to a target 4. The target 4 is made from a predetermined composition of compound material as described below. For example, in some embodiments the target may be a 1" diameter and ⅛" thick disc target of Fe—Au (25/75 weight percent), Fe—Pt (50/50 mol percent), or Cu/In (50/50 mol percent). It can also be any other predetermined composition of materials. Other examples of the composite materials to be considered are combinations of Cr, Mn, Fe, Co, Ni, Au, Ag, Pt, Cu, and Pd. The target 4 is submerged a distance, from several millimeters to preferably less than 1 centimeter, below the surface of a liquid 5. The target 4 is positioned in a container 7 additionally but not necessarily having a removable glass window 6 on its top. Optionally, an O-ring type seal 8 is placed between the glass window 6 and the top of the container 7 to prevent the liquid 5 from leaking out of the container 7. Additionally but not necessarily, the container 7 includes an inlet 12 and an outlet 14 so the liquid 5 can be passed over the target 4 and thus be re-circulated. The container 7 is optionally placed on a motion stage 9 that can produce translational motion of the container 7 and liquid 5. Flow of the liquid 5 is used to carry the nanoparticles 10 generated from the target 4 out of the container 7 to be collected. The flow of liquid 5 over the target 4 also cools the laser focal volume. The liquid 5 can be any liquid that is largely transparent to the wavelength of the laser beam 1, and preferably is a poor solvent for the target material 4. In one embodiment, the liquid 5 is deionized water having a resistivity of greater than 0.05 MOhm·cm, and preferably greater than 1 MOhm·cm. In other embodiments it can be a volatile liquid such as ethanol or other alcohols. Using a volatile liquid as the liquid 5 can be of benefit when the nanoparticles 10 are collected and concentrated or when they are applied to a substrate to form, for example, thin film solar cells.

Other functional chemical agents, for example, surfactants, reduction agents, ligands, and stabilizers. can also be added to the liquid 5. Such chemical agents may improve colloid stability (lifetime), avoid oxidation, facilitate attachment to molecules and/or delivery of compounds, and/or facilitate collection of the nanoparticles.

Some examples of surfactants include, but are but not limited to: anionic surfactants such as sodium lauryl sulfate (SDS), sodium lauryl ether sulfate (SLES), cationic surfactants such as cetyl trimethylammonium bromide (CTAB), cetyl trimethylammonium chloride (CTAC), and nonionic surfactants such as cetyl alcohol, stearyl alcohol, octamethylene glycol monododecyl ether, and Triton X-100.

Some examples of reduction agents include, but are not limited to: sodium borohydrate, sodium citrate, acetonedicarboxylic acid, citric acid, ascorbic acid, and hydrazine.

Some examples of ligands include, but are not limited to: hydrophobic ligand molecules such as trioctyiphosphine oxide (TOPO), triphenylphosphine (TPP), deodecanethiol (DDT), tetraoctylammonium bromide (TOAB), and oleic acid (OA), hydrophilic ligand molecules such as mercaptoacetic acid (MAA), mercaptopropionic acid (MPA), mercaptoundecanoic acid (MUA), mercaptosuccinic acid (MSA), dihydrolipid acid (DHLA), bis-sulphonated triphenylphoshine, thiolated poly(ethylene) glycol (mPEG-SH).

Some examples of stabilizers include, but are not limited to: gelatin, citric acid, ethylene glycol (EG), polyvinylpyrrolidone (PVP), thiol compounds, sodium borohydrate, sodium citrate, acetonedicarboxylic acid, citric acid, ascorbic acid, and hydrazine.

Some examples of the liquid media include, but are not limited to: water, acetone, methanol, ethanol, 2-isopropanol, octane, hexane, aqua media, and may be combined with one or more of a stabilizer, surfactant, ligand and reduction agent as described above.

In at least one embodiment the laser wavelength is about 1 $\mu$m which passes through nearly transparent liquids, for example water, acetone, or alcohol, with near minimal absorbance at the wavelength. The laser pulse repetition rate is preferably 10 kHz and above. More preferably, the repetition rate will exceed about 100 kHz, and may be in the range from about 100 KHz to 5 MHz, or about 100 KHz to 100 Mhz, depending on application requirements, for example pulse energy and/or repetition rate. The pulse energy is preferably 1 micro-Joule ($\mu$J) and above. For processing a metal composite target, a focused spot diameter may be about 100 $\mu$m or less. IMRA America Inc., the assignee of the present application, has disclosed and developed several fiber-based chirped pulse amplification systems which provide an ultrashort pulse duration from 10 femtoseconds to 200 picoseconds, single pulse energy ranging from 1 to 100 $\mu$J, and average power of more than 10 watts (W). Generally, the pulse duration of a laser beam used according to the present invention is from 1 femtosecond to 500 picoseconds, more preferably from about 0.1 picoseconds to 30 picoseconds. In some embodiments, a pulse duration up to about 500 ps or somewhat longer may be utilized to ablate a metal composite target, and the pulse energy may be increased so as to maintain a desirable peak pulse power. In some embodiments the pulse energy is from 100 nanoJoules (nJ) to 1 milli-Joule (mJ) and more preferably from 1 $\mu$J to 10 $\mu$J. In various embodiments, the laser system used in ablation according to the present invention comprises in sequence: a seed laser with a high repetition rate of between 30 and 100 MHz which also typically includes an oscillator, a pulse stretcher, and a preamplifier; an optical gate to select pulses from the seed laser; a power amplifier stage that amplifies the selected pulses, and a pulse compressor. These laser systems are especially suitable for the application in the current invention.

In one embodiment the guide mechanism 3 is a vibration mirror 3 that is configured for fast rastering or other movement of the laser beam 1 on the surface of the target 4. The vibration frequency of mirror 3 is preferably 10 Hz or greater. The vibration has an angular amplitude of 0.1 mrad or greater, and preferably of 1.0 mrad or greater, such that a rastering speed on the surface of the target 4 is 0.01 meters per second or greater, and preferably 0.1 meters per second or greater. Such a mirror 3 can be a piezo-driven mirror, a galvanometer mirror, or other suitable apparatus for directing the laser beam 1.

In one embodiment, flow of the liquid 5 through the container 7 is carried out by a circulation system, with a flow speed preferably of 1.0 milliliter per second or greater, and more preferably of 10.0 milliliter per second or greater. Flow of liquid 5 is necessary to uniformly distribute the generated nanoparticles 10 and to remove them from the container 7. It is preferred to maintain a sufficient volume of the liquid 5 to avoid any fluctuations in the thickness of liquid 5 above the target 4. If the liquid 5 thickness varies, it can change the optical path properties of the laser beam 1 and cause a broader distribution of sizes of the generated nanoparticles 10. The optical window 6 above the flowing liquid 5 helps to keep a constant thickness of liquid 5 above the target 4. When a circulation system is not available, introducing lateral vibration using the motion stage 9, for example a movement perpendicular to the laser beam 1 as indicated in FIG. 1, can also cause liquid 5 flow locally across the ablation spot. The motion stage 9 preferably has a vibration frequency of several Hz and amplitude of several millimeters. A shaker can also be used to circulate the liquid 5, wherein the circular movement of the shaker causes the liquid 5 in the container 7 to have a circular movement, therefore the nanoparticles 10 can distribute evenly in the liquid 5. A magnetic stirrer can also be used to circulate the liquid 5, wherein the circular movement of the stirrer causes the liquid 5 in the container 7 to have a circular movement. With either of the vibrational methods of circulating the liquid 5, the glass window 6 is not necessary; however, the use of either will introduce non-uniformity into the thickness of the liquid 5 above the target 4 and will cause a broader size distribution of the nanoparticles 10.

Composite materials may be formed with a combination of materials selected from Cr, Mn, Fe, Co, Ni, Pr, Nd, Sm, Eu, Gd, Tb, Dy, Ho, Er, Tm, Au, Pt, Pd, Ag, and Cu. Preferably, the combination is selected from an elemental group in which the elements do not make alloys, such as Au—Fe, Au—Co, Au—Ni, Au—Pt. And the combination can be of metals, metal oxides, metal nitrides, and/or metal chalcogenides.

Suitable targets include, for example, Au—Fe (Au 75 wt. % and Fe 25 wt. %) from ACI alloys Inc., Fe—Pt from Kurt J. Lesker Inc., Cu/In (50/50 atomic percent) from SCI engineered materials. The dimensions of Au—Fe, Fe—Pt, and Cu—In targets are 1" diameter with about 1/8" thickness, 1" diameter with about 0.040" thickness, and 1" diameter with about 1/8" thickness, respectively. The target size can be smaller because ejection of the composite nanoparticles is achieved by an energy source. The surface area of the target is preferably greater than 1 mm$^2$. The thickness of the target is preferably at least about 1 um. For convenience, the target materials can be attached to a bigger piece of a bulk material such as a glass slide, metal oxide substrate, and Si substrate.

After forming composite materials with a method and system of the present invention, it is desirable to determine the morphology, relative population, stoichiometry and/or other features of various composite nanoparticle structures. The information may then be utilized to adjust laser parameters so as to tune material properties and/or for process control. For example, for a given type of composite nanoparticle it may be desirable to specify a range of laser parameters, for example a range of energies and/or pulse durations corresponding with process limits, % yield of particular particle structures, and the like.

Several commercially available analytic instruments suitable for nanoscale characterization facilitate such process evaluation and control. By way of example, a JEOL 2010F Analytical Electron Microscope, or other suitable electron microscope, may be utilized to obtain Z-contrast images and electron diffraction patterns to characterize the composite nanoparticles. The brightness of a Z-contrast image is a function of the atomic number squared ($Z^2$) of the elements in the sample under test, providing structural information on the sample at the atomic level.

Transmission electron microscopy (TEM) may also be used to characterize composite nanoparticles, and suitable measurements may be obtained using a JEOL 2010F Analytical Electron Microscope and JEOL 3011 High Resolution Electron Microscope. By way of an example, a JEOL 3011 High Resolution Electron Microscope or other suitable device may be used for acquiring high resolution images of a composite nanoparticle.

One of many benefits of using an ultrafast pulsed laser is improvement of stoichiometry control of the generated composite nanoparticle compared with longer pulsed lasers, such as nanosecond lasers. Without subscribing to any particular theory, the non-thermal nature of ultrafast laser processing may reduce or avoid adverse effects of processing on stoichiometry. Moreover, short pulse durations, for example, below about 30 ps, may facilitate growth of particles having sizes in the nanoscale regime and provide for higher yield of such particles.

In the examples below the following laser parameters and bulk composite targets were used unless otherwise specified: pulse energy of 10 uJ, pulse repetition rate of 100 kHz, and laser spot size on the ablation target of about 50 μm. For the preparation of Fe—Au and Fe—Pt composite fine particles, a 1" diameter and ⅛" thick disc target of Fe—Au (25/75 weight percent) and Fe—Pt (50/50 mol percent) respectively were used.

More generally, pulse duration may be in a range from about 10 femtoseconds to about 500 picoseconds, preferably from about 100 femtoseconds to about 30 picoseconds. Pulse energy may be in the range from about 1 μJ to about 100 μJ. The pulse repetition rate may be in the range from about 10 kHz to about 10 MHz. Laser spot size may be less than about 100 μm. The target material has a size in at least one dimension greater than a spot size of a laser spot at a surface of the target material.

A composite fine particle (e.g.: composite nanoparticles) formed with a method and system as described herein may have at least one dimension less than about 5 μm, or in the range from about 10 nm to about 1 μm, 1 nm to about 50 nm, or similar ranges.

The following examples characterize fine particles made by laser ablation of bulk composite target using a laser-based system with commercially available analytic instruments, as discussed above.

Figure 2:
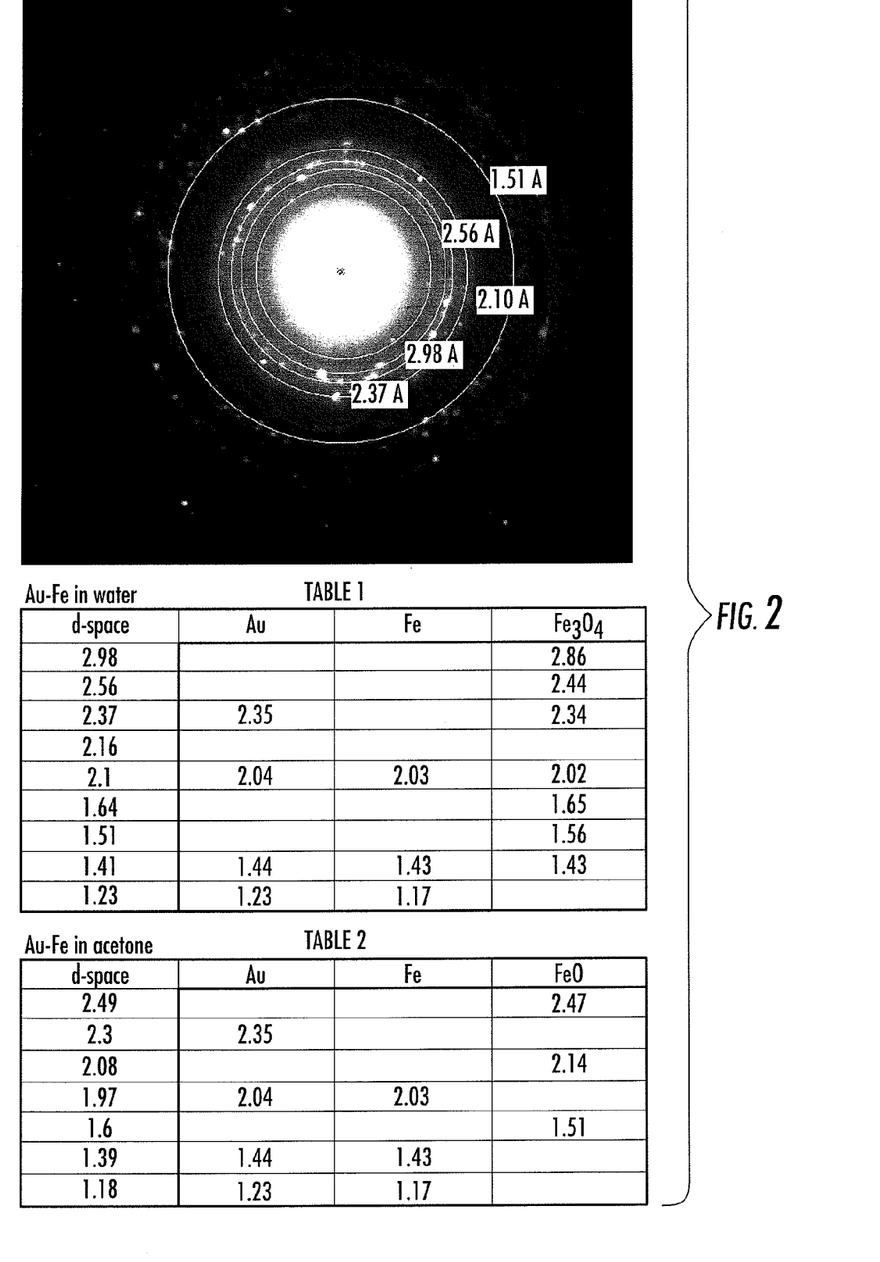
FIG. 2 illustrates an electron diffraction pattern of composite nanoparticles made from laser ablation of an Au—Fe composite target in water, and corresponding estimated lattice constants.

FIG. 2 illustrates an electron diffraction pattern of composite nanoparticles made from ablation of an Au—Fe composite target in water. The composite material structure can be identified from the diffraction pattern.

Table 1 shows lattice constants obtained from the electron diffraction pattern of Au—Fe colloids in water as shown in FIG. 2.

Table 2 shows lattice constants obtained from the electron diffraction patterns of Au—Fe colloids in acetone (diffraction patterns not shown).

The results shown in FIG. 2, Table 1, and Table 2 lead to useful observations regarding the morphology and phase: First, the composite fine particles are a mixture of well crystallized phases and polycrystalline phases. Second, the results from Au—Fe colloids made in acetone suggest that the colloids contain three phases: Fe, Au, and FeO. Third, the results from Au—Fe colloids in water suggest the colloids contain three phases: metallic Fe, Au, and $Fe_3O_4$. As will be shown in the following paragraphs, the nanocomposites may be classified into distinct categories.

Figure 3A:
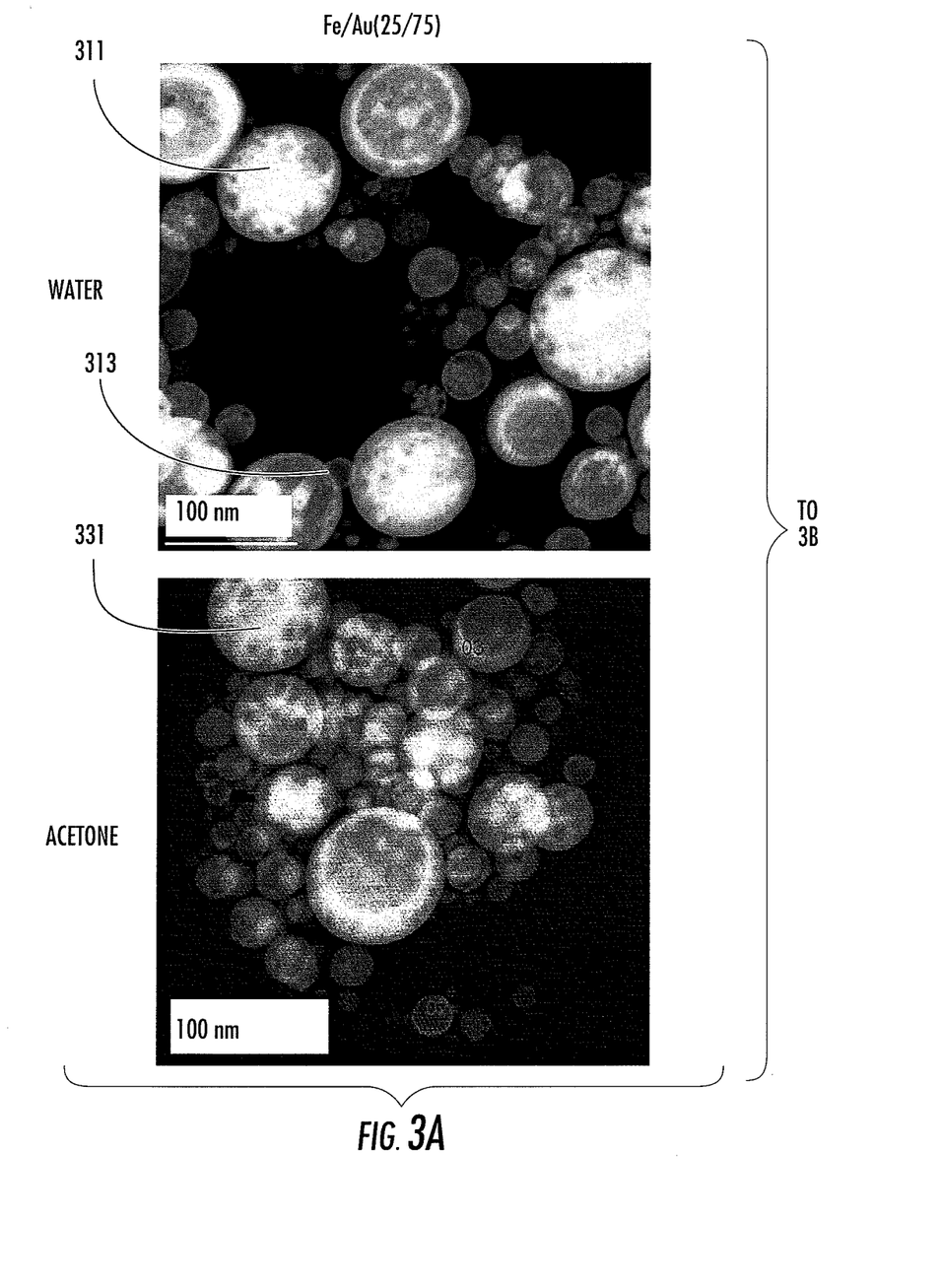
Figure 3B:
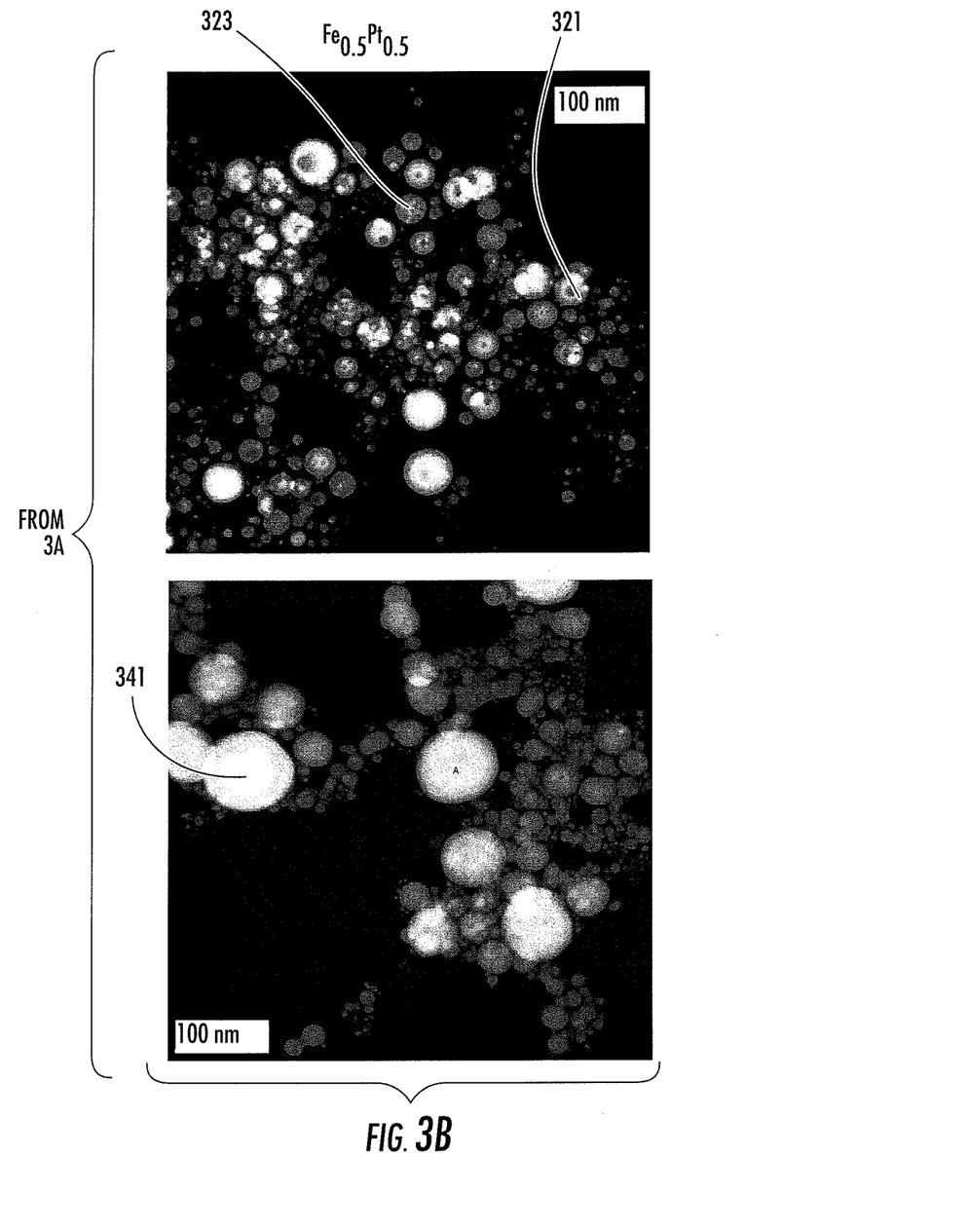
Figure 9A:
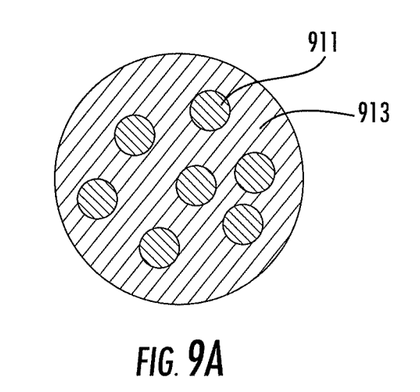
FIG. 9 shows schematic illustrations of some composite nanoparticles structures obtainable with a method and a system of the present invention.
Figure 9B:
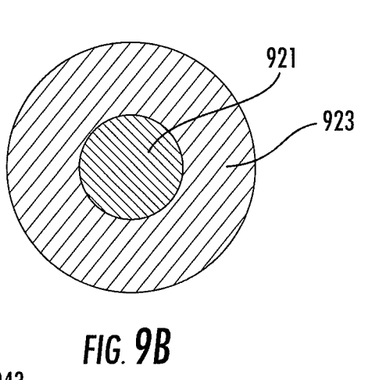
Figure 9C:
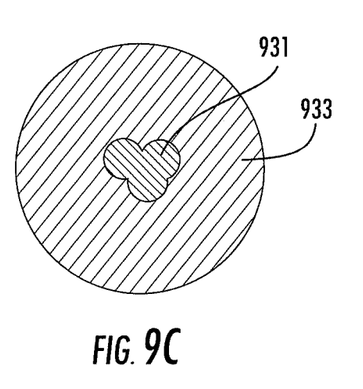

Z-contrast TEM image data is useful to further analyze and/or confirm composite nanoparticle morphology. FIG. 3 illustrates four Z-contrast TEM images obtained from Fe—Au and Fe—Pt colloids made in both water and acetone. Some Fe—Au composite fine particles, made in both water and acetone, and Fe—Pt composites made in water, contain multiple cores surrounded, for example, by Au or Pt (e.g.: nanocomposites 311, 323, and 331 in FIGS. 3A and 3B). Such multiple core composites may correspond to a structure as schematically illustrated in FIG. 9A, which will be discussed below. The structure of some composite fine particles comprises a single core and a shell outside the core (e.g.: nanocomposites 313 and 321 in FIGS. 3A and 3B). Such single core composites may correspond to a structure as schematically illustrated in FIG. 9B. Because the images are taken using the Z-contrast method, higher density material shows brighter contrast. Therefore, Au, Fe, and iron oxide correspond to the bright, medium, and dark locations in the images, respectively. In the example of Fe—Au composite nanoparticles in both water and acetone, plural cores of Fe coated with Au were observed. However, with Fe—Pt in acetone, an approximately uniform profile is observed (nanocomposite 341 of FIG. 3B). The result indicates that Fe and Pt are uniformly distributed in the particles, such as by forming a metallic alloy, not in separated phases. The difference in phase separation of the particles may partially depend on nucleation and nuclear growth of solid phase emerging from liquid or gas phase.

Figure 4A:
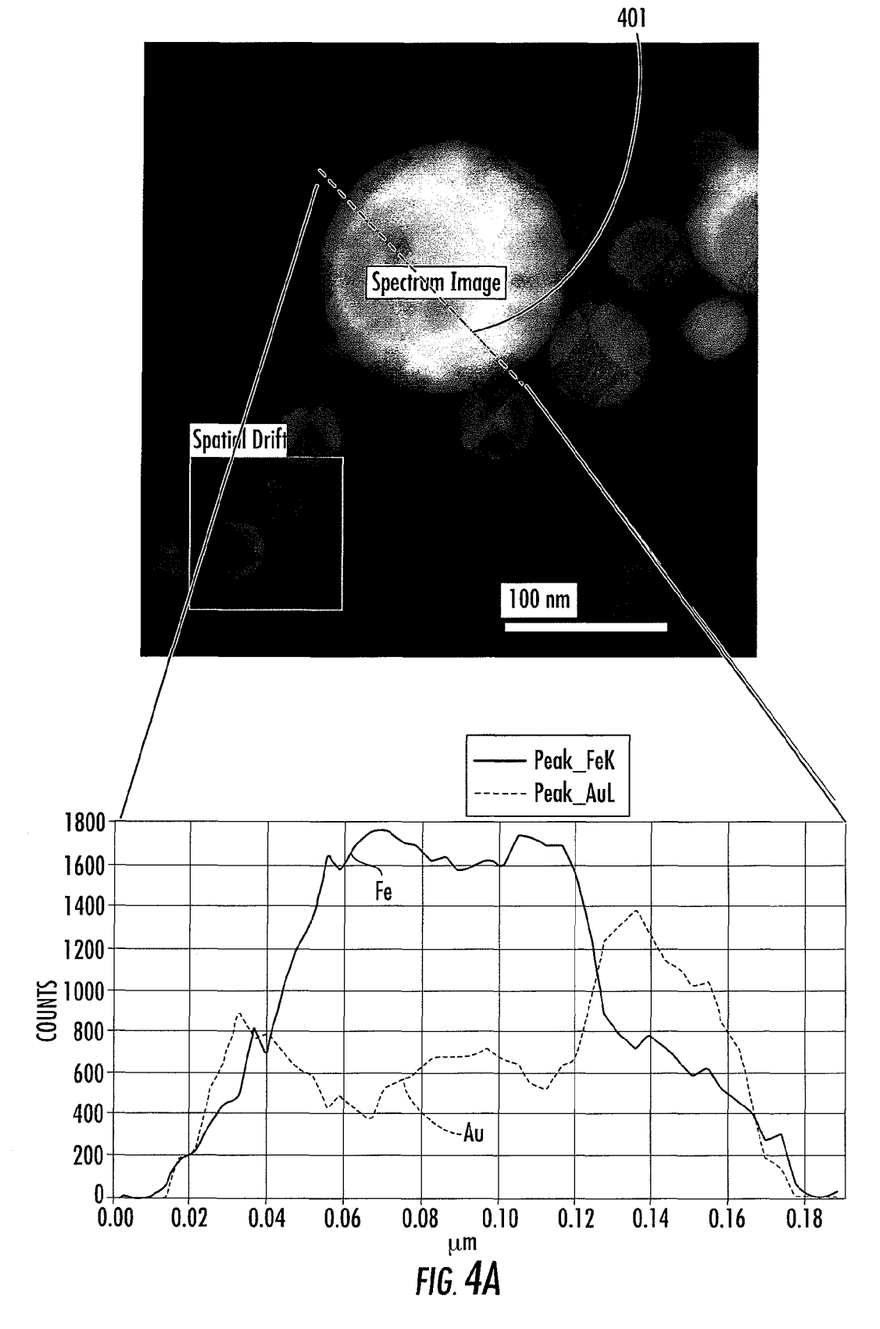
Figure 4B:
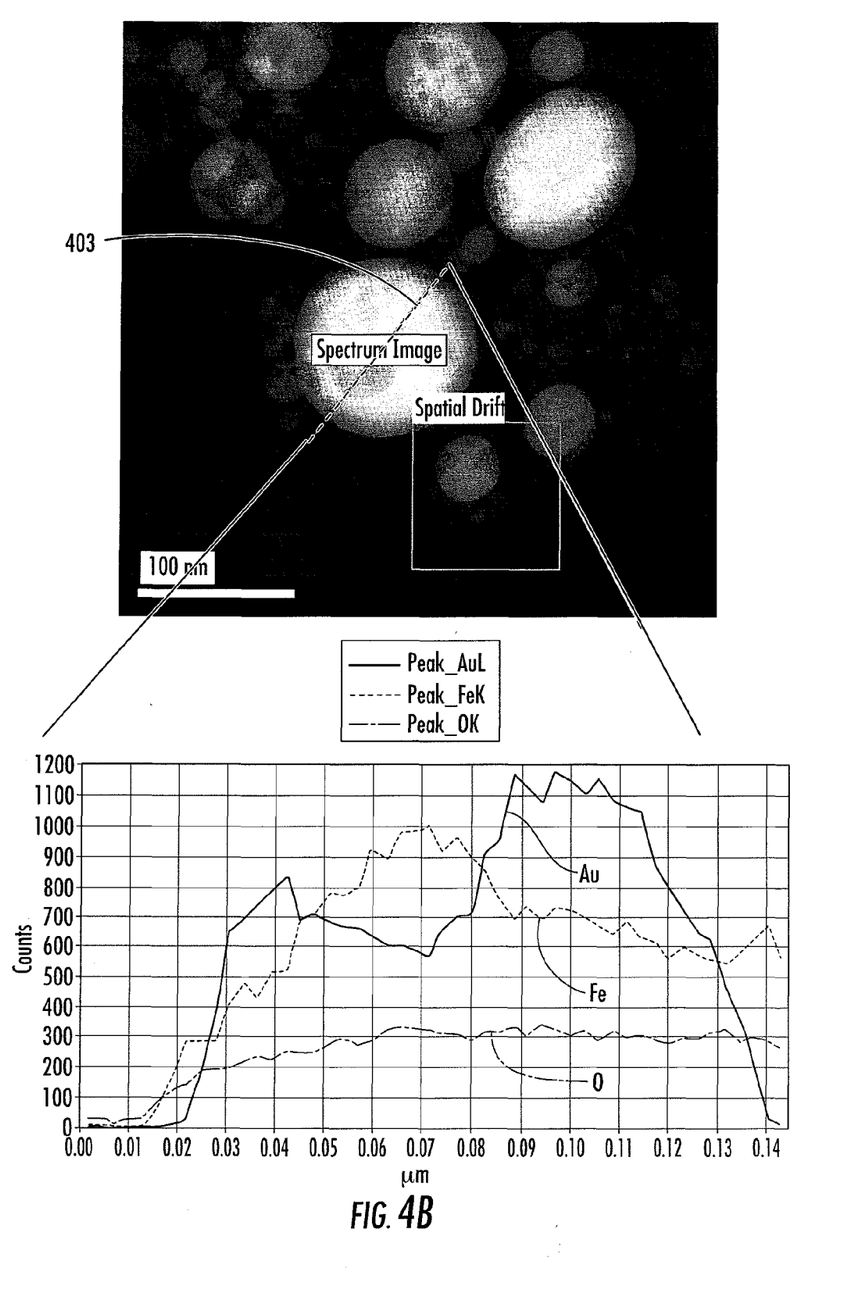

TEM may be used to determine the constituent elements of the fine particles. FIG. 4 illustrates cross section line scan results (401 and 403) of Fe, Au, and O using corresponding Z-contrast images of Fe—Au colloids in acetone (FIG. 4A) and in water (FIG. 4B). The Fe peak corresponds to the darker portion of the line scan results. Based on the line scan results, darker spots observed in the images in FIG. 4A and FIG. 4B correspond to Fe. Based on cross section line scan results in FIG. 4B, darker particles are representative of Fe metal rather than metal oxide, because the Fe amount increased while O content was approximately constant. Referring back to FIG. 3, the plural cores were further surrounded by iron oxide (e.g.: nanocomposites 311, 313, and 331 in FIG. 3A). Similarly for Fe—Pt composite collected in water, multiple cores of Fe coated with Pt are further surrounded by iron oxide (e.g.: nanocomposites 321 and 323 in FIG. 3B).

Figure 5:
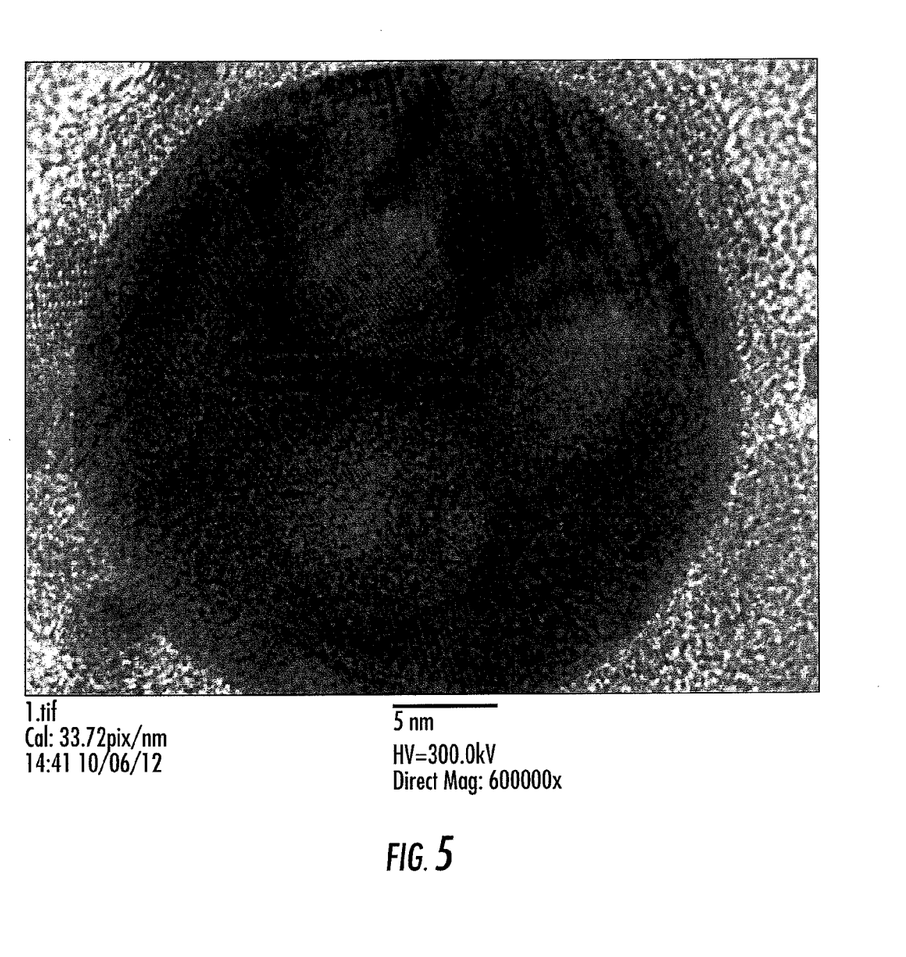
FIG. 5 shows a high resolution TEM image of a Fe—Au composite nanoparticle collected in water.

To further analyze the structure, high resolution TEM images were obtained. FIG. 5 shows a high resolution microscope image of a Fe—Au composite nanoparticle collected in water. A Moiré pattern is observable inside the particle, and the fringes indicate that materials with similar lattice constant are embedded. Since the lattice constants of metallic Fe and metallic Au are similar, the origin of the Moiré pattern can be from overlapping of Fe and Au.

Based on the above structural characterizations, the composite fine particles obtained with the laser arrangement and parameters are summarized in the following paragraphs.

Au—Fe fine particles made in acetone exhibited two types of structures. First, a single Fe metal core is surrounded by Au metal, and they are further surrounded by FeO. Second, multiple Fe metal cores are surrounded by Au metal, and they are further surrounded by FeO.

Au—Fe fine particles made in water exhibited two types of structures. First, a single Fe metal core is surrounded by Au metal, and they are further surrounded by $Fe_3O_4$. Second, multiple Fe metal cores are surrounded by Au metal, and they are further surrounded by $Fe_3O_4$.

Pt—Fe fine particles made in water exhibited two types of structures. First, a single Fe metal core is surrounded by Pt metal, and they are further surrounded by $Fe_3O_4$. Second, multiple Fe metal cores are surrounded by Pt metal, and they are further surrounded by $Fe_3O_4$.

Pt—Fe fine particles made in acetone showed a single structural phase having Fe and Pt metals. The composite fine particles do not separate into more than two phases as do the other examples mentioned above.

From the structural characterizations mentioned above, some composite nanoparticles contain multiple cores of Fe metal surrounded by Au or Pt. The composite nanoparticles may be further coated by iron oxide, while the iron oxide phase is dependent on the liquid that the colloids are made within. Composite particles are selected from, but not limited to, a combination of Cr, Mn, Fe, Co, Ni, Pr, Nd, Sm, Eu, Gd, Tb, Dy, Ho, Er, Tm, Au, Pt, Pd, Ag, and/or Cu.

The optical and/or magnetic properties of the composite fine particles may be exploited for various applications. Magnetic properties indicate that the fine particles may be useful for collection and contrast agent applications. Optical properties indicate that the colloid may be useful for coloring/labeling, plasmonic applications and other optical characterizations, for example: enhancement, measurement and/or manipulation of ultraviolet and visible (UV-vis) spectra, infrared (IR) spectra, Raman spectra, luminescence (fluorescence), or X-ray spectra, and the like.

Figure 6:
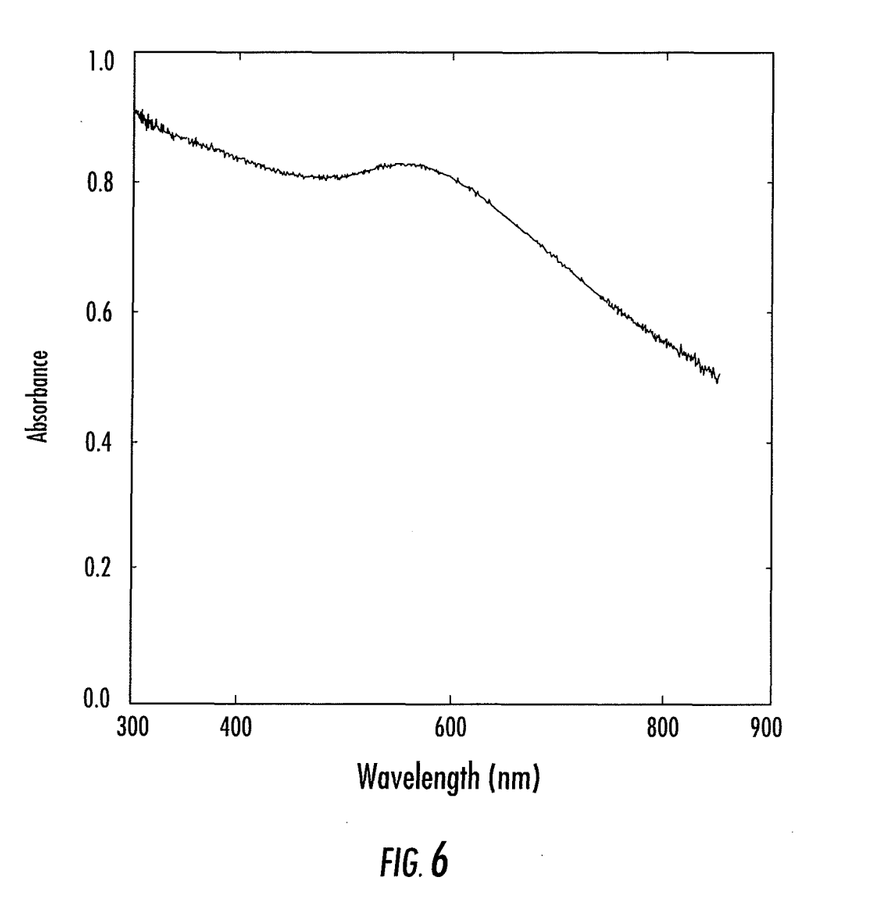
FIG. 6 illustrates UV-Visible spectra obtained from Au—Fe particles in water after PEGylation.

As an example of the mentioned optical properties, FIG. 6 illustrates an example of UV-Visible spectra obtained from Au—Fe nanocomposite particles in water, after PEGylation. For the PEGylation process, thiolated PEG with molecular weight of 20,000 was used in this example. 2 mM PEG solution in water is mixed with about the same amount of Fe—Au colloid solution. After the PEGylation process, the particle dispersion is more stable. The results indicate that the particles show a plasmon peak originated from Au, suggesting that the colloid may be used for coloring/labeling materials, DDS, bioconjugation, and similar applications where the properties of Au are exploited.

Figure 7:
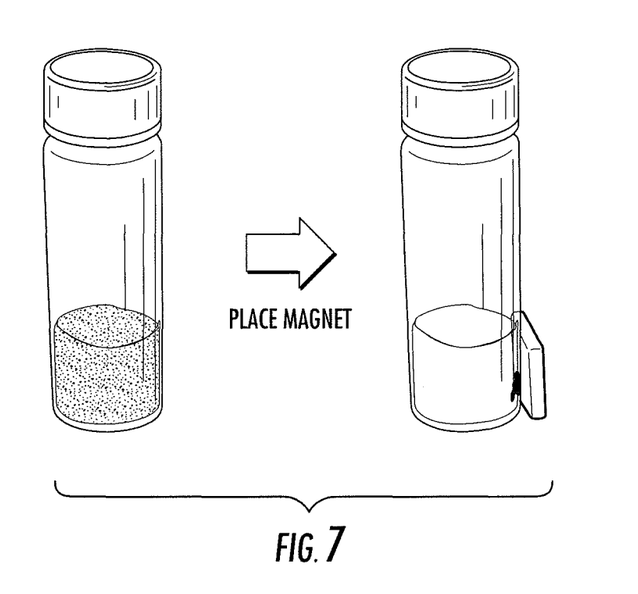
FIG. 7 illustrates Au—Fe composite nanoparticles formed in water and collection of the composite fine particles with a magnet thereafter.

In some embodiments composite nanoparticles exhibit magnetic properties which can facilitate collection of the nanoparticles. FIG. 7 illustrates images of Au—Fe composite nanoparticles collected in water. The left image shows the samples as prepared and dispersed in water. The right image shows that composite particles are collected by a magnet. Similar results are confirmed with Fe—Au composite nanoparticles dispersed in acetone and FePt composite nanoparticles dispersed in both water and acetone. The collection of the composite nanoparticles using a magnet demonstrates a ferromagnetic property, or at least a super paramagnetic property.

Figure 8:
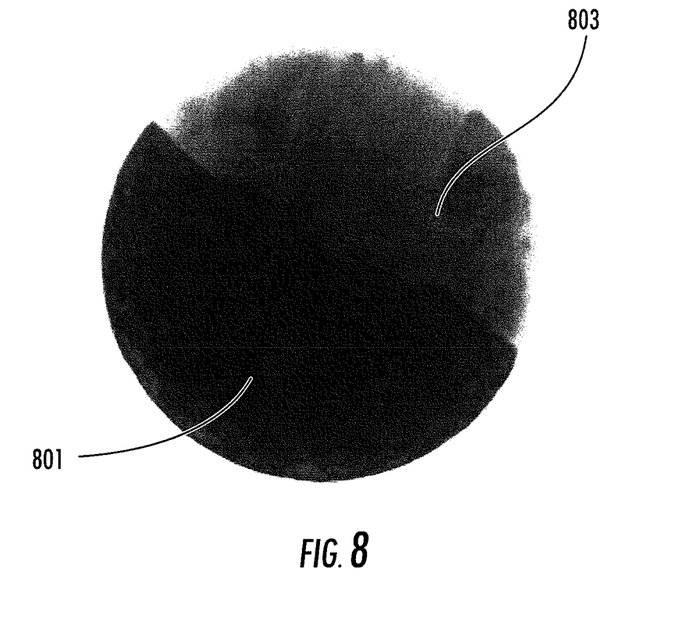
FIG. 8 illustrates a high resolution TEM image of an anisotropic copper-indium (Cu—In) composite nanoparticle structure formed by laser ablation in acetone.

FIG. 8 shows a high resolution TEM image of an anisotropic Cu—In composite structure fabricated and collected in acetone. The structure has at least one portion (compartment) of first composition and another portion (compartment) of second composition. The composite fine particles were made by laser ablation of a Cu—In target with 6 uJ pulse energy, 500 kHz repetition rate, and 3 W laser power, respectively. Based on electron diffraction images (not shown), a portion 801 of the composite structure is identified as In metal phase; and portion 803 is identified as $Cu_2In$ phase.

FIG. 9 shows schematic illustrations of some composite nanoparticle structures obtainable with a method and a system of the present invention. Table 3, shown in FIG. 10, also summarizes the type of structures illustrated in FIG. 9. FIG. 9A shows a composite nanoparticle having multiple cores, and each core is surrounded by another material. FIG. 9B shows a composite nanoparticle having one core surrounded by another material. Structures in FIGS. 9A and 9B are similar to the multiple and single core structures obtained in the above experiments. FIG. 9C shows a composite nanoparticle having multiple cores which are attached together, and these cores are surrounded by another material. FIGS. 9D and 9E show a composite nanoparticle having two different materials attached together to create a composite nanoparticle.

Figure 9D:
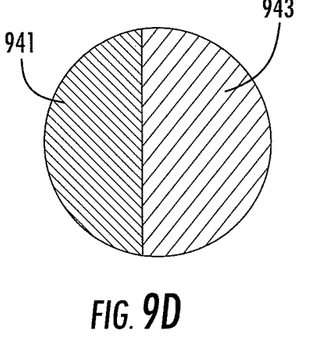
Figure 9E:
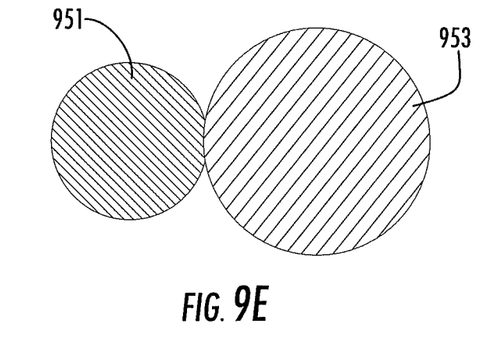
Figure 10:
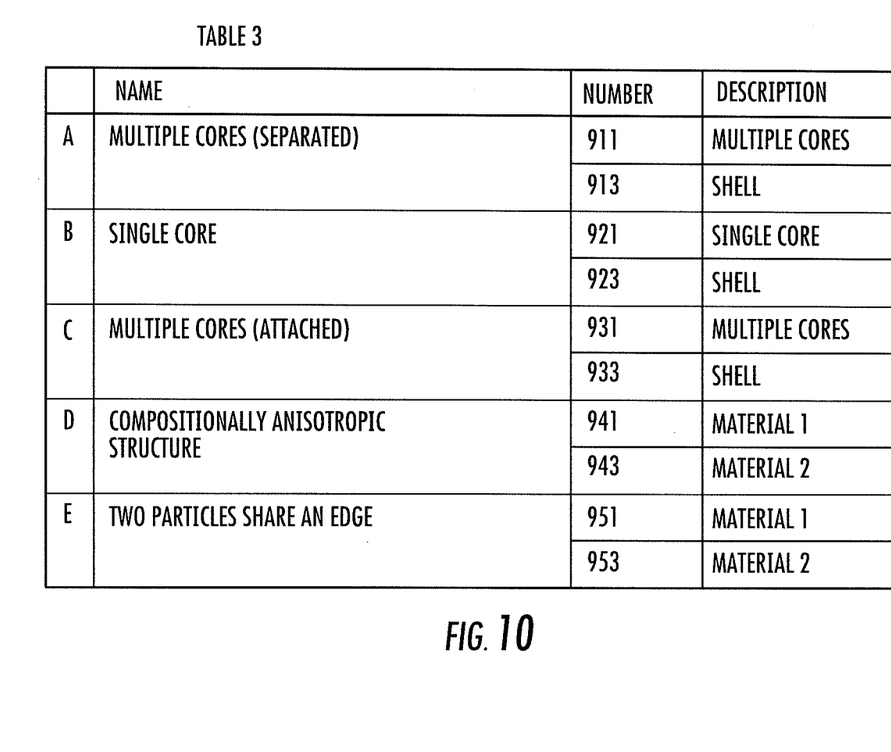
FIG. 10 is a table summarizing the contents of FIG. 9.

FIG. 9D shows an example of compositionally anisotropic structure. FIG. 9E is similar to a Dumbbell-like structure previously referred to herein, and disclosed in "Dumbbell-like Bifunctional Au—$Fe_3O_4$ Nanoparticles" Nano Letters (2005) Vol. 5, No. 2, 379-382 H. Yu et al.

The underlying mechanisms that lead to the formation of the composite structures are not fully understood. Although it is not necessary to the practice of embodiments of the disclosed systems and methods to understand the operative mechanism for these unexpected results, and without subscribing to any particular theory, control of these structures may be interrupted by nucleation and nuclear growth from liquid or gas to solid phase. During the laser ablation, the materials are expected to experience high temperature and high pressure. Nucleation and nuclear growth of solids are functions of material properties, temperature, pressure, and time during the laser ablation. By varying material combination, composition, and laser parameters such as pulse energy and pulse duration, the structure of the composite fine particles may be controlled or selected. Nucleation and nuclear growth of the particles has been discussed by many theories such as Spinodal decomposition and Binodal decomposition. Generally, with the laser parameters used in the examples herein, the difficulty of creating these fine particle structures increases from FIG. 9A to FIG. 9E.

Based on the interpretation as to how composite fine particles are generated, other physical sources that can generate high temperature in liquid can be used. Other physical energy source(s) such as continuous wave (CW) lasers, electric fields, ultrasound, shock waves, electromagnetic fields, a thermal source, and/or magnetic fields may be utilized. To make smaller composite fine particles or to induce more cores in the structure, a short pulse duration laser may be preferable.

The magnetic materials used in various embodiments include, but are not limited to: Cr, Mn, Fe, Co, Ni, Pr, Nd, Sm, Eu, Gd, Tb, Dy, Ho, Er, or Tm. Their metallic alloys show magnetic properties. Some metal oxides and nitrides also show magnetism, including but not limited to metal oxides and nitrides of Cr, Mn, Fe, Co, Ni, Pr, Nd, Sm, Eu, Gd, Tb, Dy, Ho, Er, or Tm.

Exemplary applications of these magnetic materials may include collecting nanoparticles using a magnetic field, or making contrast agents for magnetic resonance imaging (MRI).

Thus, the invention has been described in several embodiments.

At least one embodiment includes a composite fine particle having: a first magnetic material; and a second material in contact with the first magnetic material, the second material being suitable for optical characterization of a material and/or plasmon coupling. The composite fine particle is formed by laser ablation of a bulk composite material in a liquid, wherein the bulk composite material comprises the first magnetic material and the second material.

In at least one embodiment, the composite fine particle comprises at least one dimension in the range from about 1 nm to less than about 5 μm.

In at least one embodiment, the composite fine particle comprises a core/shell structure comprising a core of a first composition and a shell of a second composition, wherein the shell surrounds at least a portion of the core.

In at least one embodiment, at least two cores of a first composition are embedded in a matrix of a second composition.

In at least one embodiment, the composite fine particle comprises a compositionally anisotropic structure comprising at least one compartment of first composition and another compartment of second composition.

In at least one embodiment, each of the first and second materials comprise metal, semiconductor, dielectric, and polymer.

In at least one embodiment, the magnetic material comprises a metal, a metal oxide, and/or metal nitride.

In at least one embodiment, the magnetic material contains at least one of Cr, Mn, Fe, Co, Ni, Pr, Nd, Sm, Eu, Gd, Tb, Dy, Ho, Er, and Tm.

In at least one embodiment, the second material is selected from Au, Ag, Cu, Pt, Pd, and/or their alloys.

In at least one embodiment, the liquid is selected from: water, alcohol, and organic solvents, wherein the liquids contain zero, one or more chemical additives comprising surfactants, reduction agents, ligands, stabilizers.

In at least one embodiment, the composite fine particle has a size in the range from about from 10 nm to about 200 nm.

In at least one embodiment, the first magnetic material is at least partially surrounded by the second material.

At least one embodiment includes a method of preparing composite nanoparticles. The method comprises: ejecting material from a bulk target material using a physical energy source, the bulk target material being disposed in a liquid; forming composite nanoparticles by cooling at least a portion of ejected material in the liquid; and collecting at least a portion of the composite nanoparticles.

In at least one embodiment, the bulk material comprises a composite target having a mixture or multilayers of the components of the composite nanoparticles.

In at least one embodiment, the physical energy source comprises at least one of a laser, an electric field, ultrasound, a shock wave, an electromagnetic field, a thermal source, and a magnetic field.

In at least one embodiment, the liquid comprises one or more of water, alcohol, and an organic solvent, wherein the liquid contains zero, one or more chemical additives comprising surfactants, reduction agents, ligands, and a stabilizers.

In at least one embodiment, the physical energy source comprises a pulsed laser.

In at least one embodiment, the physical energy source comprises a pulsed laser generating at least one pulse having a pulse duration in the range from about 10 femtoseconds to about 500 picoseconds.

In at least one embodiment, the bulk target material has a size, in at least one dimension, greater than a spot size of a laser spot at a surface thereof.

In at least one embodiment, the physical energy source comprises a pulsed laser generating at least one pulse having a pulse duration in the range from about 100 femtoseconds to about 30 picoseconds.

In at least one embodiment, composite nanoparticles are directly formed by the method and without any preparation or dispersion of precursor nanoparticles in the liquids.

At least one embodiment comprises a product having composite fine particles. At least a portion of the composite fine particles comprise: a plurality of metal nanoparticle cores; and a coating of inorganic material in contact with the cores.

In at least one embodiment, the plurality of metal nanoparticle cores have a size in the range from about 1 nm to less than about 1 $\mu$m.

In at least one embodiment, a size of a composite fine particle is in the range from a few nm to less than about 5 $\mu$m.

In at least one embodiment, the nanoparticle cores and the coating each comprise at least one of Cr, Mn, Fe, Co, Ni, Pr, Nd, Sm, Eu, Gd, Tb, Dy, Ho, Er, Tm, Au, Pt, Ag, Pd, Cu, or an alloy thereof.

In at least one embodiment, a metal nanoparticle core comprises a magnetic metal.

In at least one embodiment, the composite nanoparticles are formed in a liquid comprising one or more of: water, alcohol, and an organic solvent, wherein liquid contains zero, one or more chemical additives comprising surfactants, reduction agents, ligands, and stabilizers.

At least one embodiment includes a product made with a process comprising: ejecting material from a bulk target material using a physical energy source, while the bulk target material is disposed in a liquid; and forming the composite nanoparticles by cooling at least a portion of ejected material in the liquid; and collecting at least a portion of the composite nanoparticles.

In at least one embodiment, the composite fine particle comprises a size in the range from about 10 nm to about 200 nm, the size being larger than at least a plurality of nanoparticle cores contained in the composite fine particle.

In at least one embodiment, the plurality of the metal nanoparticle cores has a size in the range from about 1 nm to about 50 nm.

In at least one embodiment, at least a portion of the composite fine particles of the product are collected from a liquid.

In at least one embodiment, at least a portion of the composite fine particles of the product are disposed in a liquid.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

We claim:

1. A composite fine particle comprising:
a first magnetic material; and
a second material in contact with said first magnetic material, said second material being suitable for optical characterization of a material and/or plasmon coupling, wherein said composite fine particle is formed by laser ablation of a bulk composite material in a liquid, wherein said bulk composite material comprises said first magnetic material and said second material,
wherein said composite fine particle comprises a core/shell structure comprising at least two cores of a first composition and a shell of a second composition, wherein said shell surrounds at least a portion of said cores,
wherein said first magnetic material comprises a metal, a metal oxide, and/or metal nitride.

2. The composite fine particle of claim 1, wherein said composite fine particle comprises at least one dimension in the range from about 1 nm to less than about 5 μm.

3. The composite fine particle of claim 1,
wherein said composite fine particle comprises at least two cores of a first composition embedded in a matrix of a second composition.

4. The composite fine particle of claim 1,
wherein said composite fine particle comprises a compositionally anisotropic structure comprising at least one compartment of first composition and another compartment of second composition.

5. The composite fine particle of claim 1, wherein said composite fine particle has a size in the range from about from 10 nm to about 200 nm.

6. The composite fine particle of claim 1, wherein said first magnetic material is at least partially surrounded by said second material.

7. A composite fine particle comprising:
a first magnetic material; and
a second material in contact with said first magnetic material, said second material being suitable for optical characterization of a material and/or plasmon coupling, wherein said composite fine particle is formed by laser ablation of a bulk composite material in a liquid, wherein said bulk composite material comprises said first magnetic material and said second material,
wherein said composite fine particle comprises a core/shell structure comprising at least two cores of a first composition and a shell of a second composition, wherein said shell surrounds at least a portion of said cores,
wherein said first magnetic material contains at least one of Cr, Mn, Fe, Co, Ni, Pr, Nd, Sm, Eu, Gd, Tb, Dy, Ho, Er, and Tm.

8. A composite fine particle comprising:
a first magnetic material; and
a second material in contact with said first magnetic material, said second material being suitable for optical characterization of a material and/or plasmon coupling, wherein said composite fine particle is formed by laser ablation of a bulk composite material in a liquid, wherein said bulk composite material comprises said first magnetic material and said second material,
wherein said composite fine particle comprises a core/shell structure comprising at least two cores of a first composition and a shell of a second composition, wherein said shell surrounds at least a portion of said cores,
wherein said second material is selected from Au, Ag, Cu, Pt, Pd, and/or their alloys.

9. A composite fine particle comprising:
a first magnetic material; and
a second material in contact with said first magnetic material, said second material being suitable for optical characterization of a material and/or plasmon coupling, wherein said composite fine particle is formed by laser ablation of a bulk composite material in a liquid, wherein said bulk composite material comprises said first magnetic material and said second material,
wherein said composite fine particle comprises a core/shell structure comprising at least two cores of a first composition and a shell of a second composition, wherein said shell surrounds at least a portion of said cores,
wherein said liquid is selected from: water, alcohol, and an organic solvent, wherein said liquid contains zero, one or more chemical additives comprising surfactants, reduction agents, ligands, and stabilizers.

10. A method of preparing composite nanoparticles, comprising:
ejecting material from a bulk target material using a physical energy source comprising a pulsed laser, said bulk target material comprising a first magnetic material and a second material disposed in a liquid;
forming composite nanoparticles by cooling at least a portion of ejected material in said liquid, said composite nanoparticles characterized by having, in a nanoscale regime: a combination of said first magnetic material and said second material, said second material in contact with said first magnetic material, said second material being suitable for optical characterization of a material and/or plasmon coupling; and
collecting at least a portion of said composite nanoparticles.

11. The method of claim 10, wherein said bulk material comprises a composite target having a mixture or multilayers of the components of said composite nanoparticles.

12. The method of claim 10, wherein said physical energy source further comprises at least one of an electric field, ultrasound, a shock wave, an electromagnetic field, a thermal source, or a magnetic field.

13. The method of claim 10, wherein said liquid comprises one or more of water, alcohol, and an organic solvent, wherein said liquid contains zero, one or more chemical additives comprising surfactants, reduction agents, ligands, and stabilizers.

14. The method of claim 10, wherein said pulsed laser generates at least one pulse having a pulse duration in the range from about 10 femtoseconds to about 500 picoseconds.

15. The method of claim 13, wherein said bulk target material has a size, in at least one dimension, greater than a spot size of a laser spot at a surface thereof.

16. The method of claim 10, wherein said pulsed laser generates at least one pulse having a pulse duration in the range from about 100 femtoseconds to about 30 picoseconds.

17. The method of claim 10, wherein said composite nanoparticles are directly formed by said method without any preparation or dispersion of precursor nanoparticles in said liquid.

* * * * *